United States Patent [19]

Moriarity

[11] 4,452,681
[45] Jun. 5, 1984

[54] METHOD OF ELECTRODEPOSITION OF COATING COMPOSITIONS CONTAINING NOVEL URETHANE CURING AGENTS

[75] Inventor: Thomas C. Moriarity, Allison Park, Pa.

[73] Assignee: PPG Industries, Inc., Pittsburgh, Pa.

[21] Appl. No.: 465,704

[22] Filed: Feb. 10, 1983

[51] Int. Cl.³ .............................................. C25D 13/06
[52] U.S. Cl. .............................. 204/181 R; 204/181 C
[58] Field of Search ........................ 204/181 C, 181 R

[56] References Cited

U.S. PATENT DOCUMENTS

| | | | |
|---|---|---|---|
| 2,333,639 | 11/1943 | Christ et al. | 260/75 |
| 2,671,067 | 3/1954 | Brown | 260/32.6 |
| 2,681,329 | 6/1954 | Stanton et al. | 260/45.9 |
| 2,939,851 | 6/1960 | Orchin | 260/2.5 |
| 3,040,002 | 6/1962 | Aldridge | 260/77.5 |
| 3,089,862 | 5/1963 | Fetterly et al. | 260/75 |
| 3,248,372 | 4/1966 | Runge | 260/77.5 |
| 3,317,463 | 5/1967 | Schonfeld et al. | 260/47 |
| 3,454,621 | 7/1969 | Engel, Jr. | 460/471 |
| 3,457,200 | 7/1969 | Critchfield et al. | 260/2.5 |
| 3,488,272 | 1/1970 | Frisch et al. | 204/181 R |
| 3,554,872 | 1/1971 | Chang et al. | 203/38 |
| 3,679,564 | 7/1972 | Dowbenko et al. | 204/181 |
| 3,773,729 | 11/1973 | Wakimoto et al. | 204/181 R |
| 3,883,483 | 5/1975 | Anderson et al. | 260/77.5 TB |
| 3,897,377 | 7/1975 | Broecker et al. | 260/18 TN |
| 3,922,253 | 11/1975 | Jerabek et al. | 260/77.5 TB |
| 3,963,710 | 6/1976 | Aufdermarsh, Jr. | 260/247.2 A |
| 4,008,192 | 2/1977 | Mijs et al. | 260/18 TN |
| 4,046,729 | 9/1977 | Scriven et al. | 204/181 R |
| 4,055,518 | 10/1977 | Kakitani et al. | 260/2.5 AM |
| 4,066,591 | 1/1978 | Scriven et al. | 204/181 R |
| 4,153,775 | 5/1979 | Winkelmann et al. | 528/45 |
| 4,212,962 | 7/1980 | Schmitt et al. | 528/45 |
| 4,277,383 | 7/1981 | Hayashi et al. | 204/181 C |
| 4,310,398 | 1/1982 | Gimpel et al. | 204/181 C |
| 4,320,220 | 3/1982 | Pampouchidis | 524/591 |

OTHER PUBLICATIONS

U.S. Patent application Serial No. 409,273, filed Aug. 18, 1982, by Joseph T. Valko.

*Primary Examiner*—Howard S. Williams
*Assistant Examiner*—Terryence Chapman
*Attorney, Agent, or Firm*—Godfried R. Akorli

[57] ABSTRACT

There is herein provided a method of electrocoating electroconductive substrates in an aqueous dispersion containing an active hydrogen-containing material which contains an ionic group, and a curing agent having a urethane-containing moiety of the structure:

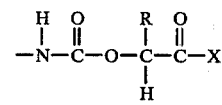

wherein R is hydrogen, an alkyl, alkenyl or aryl group; wherein X is hydrogen, an alkyl, alkenyl or aryl group, or wherein X is a moiety of the structure:

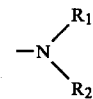

of which $R_1$ and $R_2$ are, each independently, hydrogen, an alkyl, alkenyl or aryl group, or members of a cyclic or heterocyclic group. The curing agent may be present as a separate component or be integral with the active hydrogen-containing material.

24 Claims, No Drawings

METHOD OF ELECTRODEPOSITION OF COATING COMPOSITIONS CONTAINING NOVEL URETHANE CURING AGENTS

BACKGROUND OF THE INVENTION

1. Field of the Invention

The present invention relates to novel urethanes and to the methods of making and using same. More specifically, the present invention relates to novel urethanes which can be derived from isocyanates.

2. Brief Description of the Prior Art

Curable compositions containing blocked isocyanate crosslinking agents are known in the art. Some of the crosslinking agents aid in effecting cure of these compositions at relatively low temperatures of about 320°–350° F. (160°–177° C.) over a period of 20 to 30 minutes. Yet, lower temperature cure is required for coated substrates which have plastic parts which tend to deform at the afore-stated temperatures. Hence, much work has been done to formulate compositions that cure effectively at relatively lower temperatures.

As is the case here, much work has been done in developing blocked isocyanate crosslinking agents which would aid in effecting cure at lower temperatures. The work done has shown that proper selection of blocking agents for isocyanate groups is determinative in effecting cure at low temperatures. It is believed that blocked isocyanates that unblock readily at low temperatures effect cure of coatings at low temperatures. However, their use in coating compositions is limited in some respects. In one respect, coatings derived therefrom, although useful, may have poor solvent resistance, indicating a relatively low degree of cure. In another respect, the coatings, although more completely cured, may have poor appearance. In yet another respect, some of these coating compositions, particularly the water-based compositions, are rather unstable.

By the present invention, a select group of blocking agents which are superior to blocking agents of the prior art have been found effective in overcoming the afore-stated limitations.

SUMMARY OF THE INVENTION

In accordance with the foregoing, the present invention encompasses a urethane-containing material having a moiety of the structure:

$$\begin{array}{cccc} \text{H} & \text{O} & \text{R} & \text{O} \\ | & \| & | & \| \\ -\text{N}-\text{C}-\text{O}-\text{C}-\text{C}-\text{X} \\ & & | \\ & & \text{H} \end{array}$$

Preferably, R is hydrogen, an alkyl, alkenyl or aryl group, and X is hydrogen, an alkyl, alkenyl or aryl group, or a moiety of the sturcture:

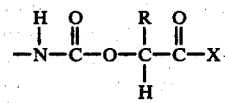

Preferably, R₁ and R₂ are, each independently, hydrogen, an alkyl, alkenyl or aryl group. In this context, the urethane-containing material is alternately referred to as "novel urethane" or "blocked isocyanate".

In a method of preparing the novel urethane, an isocyanate is reacted with a compound of the structure:

$$\begin{array}{ccc} & \text{R} & \text{O} \\ & | & \| \\ \text{HO}-\text{CH}-\text{C}-\text{X} \end{array}$$

wherein R and X are as described above. This compound is alternately referred to herein as a "novel blocking agent".

A representative example of the above compound is a glycolamide such as N,N-dibutylglycolamide. This can be reacted with an isocyanate such as 2,4-toluene diisocyanate to form the novel urethane. It has been found that the novel urethane is highly effective for low temperature cure of curable compositions such as coating compositions. In particular, it has been found that the novel urethane is very suitaable for low temperature cure of water-based compositions such as electrodepositable compositions. Notably, these compositions are stable and at relatively low temperatures provide coatings of a high degree of cure, solvent resistance, good appearance, as well as other known desirable film properties.

DETAILED DESCRIPTION OF THE INVENTION

The isocyanates which are useful in preparing the novel urethane can be monoisocyanates or polyisocyanates, or a mixture thereof; the polyisocyanates are preferred. They can be aliphatic or aromatic isocyanates, with the aromatic isocyanates being preferred for lower temperature cure. Representative of the monoisocyanates are ethylenically unsaturated monoisocyanate monomers such as vinyl isocyanate, e.g., propenyl isocyanate, isopropenyl isocyanate, 9-decenyl isocyanate, isocyanate acrylates, e.g., 2-isocyanato ethyl (meth)acrylate; allyl isocyanates, e.g., beta-allyloxyethyl isocyanate. These isocyanate monomers are typically reacted, i.e., blocked, with the novel blocking agent and then copolymerized with appropriate monomers under free radical polymerization conditions to form thermosetting compositions.

Representative examples of the polyisocyanates are aliphatic isocyanates such as alkylene isocyanates, e.g., trimethylene, tetramethylene, pentamethylene, hexamethylene, 1,2-propylene, 1,2-butylene, 2,3-butylene, 1,3-butylene, ethylidene and butylidene diisocyanates and the cycloalkylene isocyanates, e.g., 1,3-cyclopentane, 1,4-cyclohexane, 1,2-cyclohexane diisocyanates and isophorone diisocyanates. Representative examples of the polyisocyanates are aromatic isocyanates such as arylene isocyanates, e.g., m-phenylene, p-phenylene, 4,4'-diphenyl, 1,5-naphthalene and 1,4-naphthalene diisocyanates and alkarylene isocyanates, e.g., 4,4'-diphenylene methane, 2,4- or 2,6-tolylene, or mixtures thereof, 4,4'-toluidine, and 1,4-xylylene diisocyanates; nuclear-substituted aromatic compounds, e.g., dianisidine diisocyanate, 4,4'-diphenylether diisocyanate and chlorodiphenylene diisocyanate. Triisocyanates such as triphenyl methane-4,4',4''-triisocyanate, 1,3,5-triisocyanato benzene and 2,4,6-triisocyanato toluene; and the tetraisocyanates such as 4,4'-diphenyldimethyl methane-2,2',5,5'-tetraisocyanate and polymerized polyisocyanates such as tolylene diisocyanate dimers and trimers and the like can also be used herein.

In addition, the polyisocyanates may be prepolymers derived from polyols such as polyether polyols or poly= ester polyols, including polyols which are reacted with excess polyisocyanates, such as mentioned above, to form isocyanate-terminated prepolymers. Examples of the suitable isocyanate prepolymers are described in U.S. Pat. No. 3,799,854, column 2, lines 22 to 53, which is herein incorporated by reference.

As afore-stated, in preparing the novel urethane of this invention, the isocyanate is reacted with the compound of the structure:

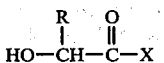

R can be hydrogen or a hydrocarbyl or substituted hydrocarbyl group, a saturated or unsaturated hydrocarbyl group such as an alkyl, alkenyl or aryl group. Examples of the alkyl groups are those containing from about 1 to 10 and preferably 1 to 5 carbon atoms. Specific examples of the alkyl groups are methyl, ethyl, butyl, cyclopentyl and decyl groups. Examples of the alkenyl groups are those containing from about 2 to 10, and preferably from 2 to 5 carbon atoms. Specific examples of the alkenyl groups are ethenyl, propenyl, butenyl and cyclohexenyl groups. Examples of the aryl groups are those containing from about 6 to 30 and preferably 6 to 15 carbon atoms. Specific examples of the aryl groups are phenyl, benzyl, tolyl, xylyl and naphthyl groups. In the particularly preferred embodiments of the invention, R is hydrogen or a methyl group.

X can be hydrogen or a hydrocarbyl or substituted hydrocarbyl group, a saturated or unsaturated hydrocarbyl group such as an alkyl, alkenyl or aryl group. Examples of the alkyl groups are those containing from about 1 to 12 and preferably from about 6 to 12 carbon atoms. Specific examples of the alkyl groups are methyl, ethyl, cyclopentyl, hexyl, and dodecyl groups. Examples of the alkenyl groups are those containing from about 2 to 12, preferably from 6 to 12 carbon atoms. Specific examples of the alkenyl groups are ethenyl, propenyl, butenyl, hexenyl, cyclooctenyl, decenyl, 2,4-hexadienyl, 1,5-hexadienyl and 4-methyl-1,5-pentadienyl groups. Examples of the aryl groups are those containing from about 6 to 30 and preferably from about 6 to 15 carbon atoms. Specific examples of the aryl groups are benzyl, tolyl, xylyl and naphthyl groups.

X can be the moiety of the structure:

$R_1$ and $R_2$, each independently, can be hydrogen or a hydrocarbyl or substituted hydrocarbyl group, a saturated or unsaturated hydrocarbyl group such as an alkyl, alkenyl or aryl group. Examples of the alkyl groups are those containing from about 1 to 26, preferably from about 2 to 18, and more preferably from about 4 to 8 carbon atoms. Specific examples of the alkyl groups are ethyl, propyl, butyl, pentyl, cyclohexyl, octyl, nonyl, decyl, dodecyl and stearyl groups. Examples of the alkenyl groups are those containing from about 2 to 26, preferably from 2 to 18, and more preferably from about 4 to 8 carbon atoms. Specific examples of the alkenyl groups are ethenyl, propenyl, butenyl, hexenyl, hexadecenyl and cyclooctenyl groups. Examples of the aryl groups can be those containing from about 6 to 30 and preferably 6 to 15 carbon atoms. Specific examples of the aryl groups are phenyl, benzyl, tolyl, xylyl, and naphthyl groups. $R_1$ and $R_2$ can be members of a cyclic or heterocyclic group such as morpholine, piperidine or the like.

Compounds possessing substantially the same properties as the unsubstituted hydrocarbyl groups exemplified above are equivalents thereof and are those wherein the hydrocarbyl group can bear one or two or more substituents. The substituents are such as would not adversely affect the reaction described herein or the utility of the invention. Non-limiting examples of the substituents are halo, e.g., fluoro and bromo; nitro; sulfato; alkoxy, e.g., methoxy, ethoxy, alkyl or alkenyl (as in aralkyl or aralkenyl), e.g., methyl, ethyl, butyl, propenyl, butenyl and the like.

Specific examples of the afore-described compounds are hydroxyacetaldehyde, acetol, 1-hydroxy-2-butanone, α-hydroxyacetophenone, N,N-dipentylglycolamide, N,N-dipropylglycolamide, N,N-dibutyllactamide, N-methyllactamide, morpholine glycolamide, lactanilide, N,N-diethyllactamide, N-methyl-N-butyllactamide and N-octylglycolamide. Of these compounds, N,N-dibutylglycolamide is particularly preferred.

As a matter of convenience, there is provided hereinbefore a suitable method of preparing the preferred glycolamides and glycollactamides. They can be prepared by reacting a corresponding acid (such as glycolic or lactic acid) or the ester thereof with an amine (such as dibutylamine). The amine is added to the acid or ester in a properly equipped reaction vessel at temperatures of about 70°–170° C. Upon reaction, there is produced a water of reaction or alcohol which can be removed by distillation. The resultant mixture may be vacuum stripped to remove the azeotropic solvent used therein and excess amine and/or unreacted acid or ester.

In preparing the novel urethane, the above compound and the isocyanate are admixed under anhydrous or substantially anhydrous conditions and generally in an inert atmosphere such as under a nitrogen blanket. The equivalent ratio of the —NCO of the isocyanate to the —OH of the above compound can be from about 0.1 to 1.2:1.

Depending on the reagents employed, the starting materials may be added simultaneously to the reaction vessel, or they may be added slowly, one to the other, at elevated temperatures. After all the ingredients have been added, the mixture is reacted (with stirring) at a temperature and for a period of time which depends, among others, on the isocyanate, until all, or virtually all of the isocyanate is reacted. For aromatic diisocyanates, the reaction is carried out at about 25° to 100° C. for about 1 to 8 hours, preferably, 35° to 80° C. for 1.5 to 5 hours. For aliphatic diisocyanates, the reaction proceeds at about 50° to 100° C. for about 3 to 10 hours, preferably 80°–100° C. for 5 to 7 hours. The degree of conversion of the reactants to the urethanes can be determined by infrared spectroscopy. It may, in some instances, be necessary to employ other reactants such as alcohols to consume unreacted isocyanates remaining in the resultant mixture.

A catalyst is usually employed in preparing the novel urethane. Catalysts useful herein are those suitable for urethane formation. Preferably, metals, metal salts or complexes, for example, lead acetate, dibutyltin dilaurate, stannous octoate and the like are employed.

A solvent is usually employed in preparing the novel urethane. Solvents that are non-reactive with isocyanates are preferred, e.g., ketones, e.g., methyl isobutyl ketone, ethers such as diethyl ether of ethylene glycols, or esters such as ethyl acetate, and other solvents such as dimethylformamide, dimethylsulfoxide or N-methyl-2-pyrrolidone.

While the above method of preparing the novel urethane is described herein with particularity, other methods of preparation can be employed. Thus, compounds or compositions obtained by other methods, having structural formula and properties as the novel urethane described herein, are encompassed by this invention.

In the practice of the invention, the novel urethane is useful in combination with active hydrogen-containing materials to form curable compositions such as coating compositions. In the preferred low temperature cure embodiments of the invention, the novel urethane is employed with cure catalysts which are more fully defined herein. The active hydrogen group can be hydroxy, primary or secondary amino or thio group. Non-limiting examples of the active hydrogen-containing materials are hydroxyl group-containing polymers, e.g., polymeric polyols, such as alkyd polymers, polyester polymers, hydroxyl group-containing acrylic polymers, hydroxyl group-containing polyurethane polymers, hydroxyl group-containing polyurea polymers, hydroxyl group-containing polyether polymers, hydroxyl group-containing epoxy polymers and hydroxyl group-containing polymers which are polyepoxide-amine adducts. The epoxy polymers can be epoxy-free or epoxy-containing.

The molecular weights of the polymeric polyols can vary over a wide range depending upon their type and on whether the curable composition is organic solvent based or water based and also on the desired performance characteristics of the coating. Polyester, epoxy and alkyd polymers can have molecular weights as low as about 500 and as high as about 50,000, preferably the molecular weights are usually in the range of about 1,000 to 5,000; the molecular weights being on a number average basis relative to polystyrene, as determined by gel permeation chromatography. Acrylic polymers prepared by solution polymerization can have molecular weights of about 100,000 or higher, and usually in the range of about 5,000 to 50,000 on a number average basis relative to polystyrene, as can be determined by gel permeation chromatography. For acrylic latices, the molecular weight can range from 100,000 to several millions.

The hydroxyl content of the polymeric polyol should be sufficient such that when the polyol is in combination with the curing agent, the composition will cure to a solvent-resistant coating. Generally, the hydroxyl number of the polymeric polyol will be at least about 50 and preferably will be in the range of about 100 to 300, based on resin solids.

A preferred class of polymeric polyols are hydroxyl group-containing epoxy polymers. A particularly preferred class of polymeric polyols are the polyepoxide-amine adducts. The epoxy polymers which can be used in the practice of the invention are polyepoxides, that is, polymers having a 1,2-epoxy equivalency greater than 1, preferably about 2 or more. Preferred are polyepoxides which are difunctional with regard to epoxy. The preferred polyepoxides are polyglycidyl ethers of cyclic polyols. Particularly preferred are polyglycidyl ethers of polyphenols such as bisphenol A. Examples of polyepoxides are given in U.S. Pat. No. 4,260,716, column 3, line 20, to column 4, line 30, the portions of which are hereby incorporated by reference.

Besides the epoxy polymers disclosed above, other epoxy-containing polymers which can be used are acrylic polymers which contain epoxy groups. These polymers are formed by polymerizing an unsaturated epoxy group-containing monomer such as glycidyl acrylate or methacrylate with one or more other polymerizable ethylenically unsaturated monomers. Examples of these polymers are described in U.S. Pat. No. 4,001,156, column 3, line 59, to column 5, line 60, the portions of which are hereby incorporated by reference.

Examples of amines which can be used in preparing the polyepoxideamine adduct are ammonia, primary, secondary and tertiary amines and mixtures thereof. The reaction product of the polyepoxide and the amine can be at least partially neutralized with an acid to form a polymeric product containing amine salt and/or quaternary ammonium salt groups. Reaction conditions of polyepoxides with amines, examples of various amines and at least partial neutralization with acid are disclosed in U.S. Pat. No. 4,260,720, column 5, line 20, to column 7, line 4, the portions of which are hereby incorporated by reference.

Also, various polyepoxide-amine adducts are described in European Patent Application No. 0012463.

With regard to the amount of organic amine and polyepoxide which are reacted with one another, the relative amounts depend upon the extent of cationic base such as cationic salt group formation desired and this in turn will depend upon the molecular weight of the polymer. The extent of cationic salt group formation and the molecular weight of the reaction product should be selected such that when the resultant cationic polymer is mixed with aqueous medium, a stable dispersion will form. A stable dispersion is one which does not settle or is one which is easily dispersible if some sedimentation occurs. In some embodiments, the dispersion should additionally be of sufficient cationic character that the dispersed polymer particles will migrate towards the cathode when an electrical potential is impressed between an anode and a cathode immersed in aqueous dispersion.

Also, the molecular weight, structure and extent of cationic salt group formation should be controlled such that the dispersed polymer will have the required flow to form a film on the substrate; in the case of electrodeposition, to form a film on the cathode. The film should be insensitive to moisture to the extent that it will not redissolve in the electrodeposition bath or be rinsed away from the coated surface after removal from the bath.

In general, most of the cationic polymers useful in the practice of the invention will have average molecular weights within the range of about 500–100,000 and contain from about 0.01 to 10, preferably about 0.1 to 5.0, preferably from about 0.3 to 3.0 milliequivalents of basic group, e.g., cationic group, per gram of resin solids. Obviously one must use the skill in the art to couple the molecular weight with the cationic group content to arrive at a satisfactory polymer. The polyglycidyl ethers will have molecular weights of about 500 to 10,000, preferably 1,000 to 5,000. acrylic polymers, on the other hand, will have molecular weights as high as 100,000, preferably 5,000 to 50,000.

Besides the cationic polymers, anionic polymers which are designed to form aqueous-based coating compositions may be used in coating applications such as electrodeposition. It should also be appreciated that organic solvent-based coating compositions employing the above polymers without ionic salt groups can also be used. Formulating coating compositions with such polymers is well known in the art and need not be described in any further detail.

The novel urethane can be a separate or integral component to the active hydrogen-containing material. For example, a polyisocyanate can be fully blocked with the novel blocking agent and be present as a separate component with the active hydrogen-containing material. Alternately, a polyisocyanate can be partially blocked with the novel blocking agent and reacted with the active hydrogen-containing material to form an ungelled one-component material. In the latter case, the resultant urethane is integral with the active hydrogen-containing material rather than being present as a separate component. Procedures for preparing integral blocked isocyanate curing agents are shown in U.S. Pat. No. 3,947,338. Whether present as a separate component or integral with the active hydrogen-containing material, the novel urethane is present in an amount sufficient to impart excellent cure to the curable composition. Typically, the urethane is present in an equivalent ratio of 0.1:1 and preferably 0.3 to 1:1 of the urethane to the active hydrogen-containing material of the curable composition.

The novel urethane is usually employed in combination with a cure catalyst. Typically, the cure catalyst is a metal salt and/or complex of a metal such as lead, zinc, iron, tin and manganese. Suitable salts of these metals are, for example, octoates and naphthanates. A suitable complex is, for example, acetyl acetonate. The cure catalyst is used is amounts sufficient to effect cure at the relatively low temperatures described herein. For example, the metal salt and/or complex is employed as a cure catalyst in amounts of about 0.1 to 2.0, preferably 0.2 to 1 percent metal by weight (solids) based on the weight of the curable compositions. The cure catalyst can be mixed simultaneously with other starting materials for the preparation of the coating composition, or introduced into the coating composition in any order that is convenient.

In the practice of the invention, the curable compositions can be used as coating, laminating or molding compositions. Preferably, they can be used as water-based or solvent-based coating compositions. The components of the coating composition can be mixed simultaneously or in any order that is convenient. If the components are a liquid and of sufficiently low viscosity, they can be mixed together neat to form the coating composition. Alternately, if the components are higher viscosity liquids or solids, the components can be mixed with a diluent to reduce the viscosity of the composition so that it may be suitable for coating applications.

By liquid diluent is meant a solvent or a non-solvent which is volatile and which is removed after the coating is applied and is needed to reduce viscosity sufficiently to enable forces available in simple coating techniques, that is, brushing and spraying, to spread the coating to controllable, desired and uniform thickness. Also, diluents assist in substrate wetting, resinous component compatibility and coalescence or film formation. Generally, when used, the diluent will be present in the composition in amounts of about 20 to 90, preferably 50 to 80 percent by weight based on total weight of the coating composition, although more diluent may be employed depending upon the particular coating application.

Examples of suitable liquid diluents for organic solvent-based coatings will depend somewhat on the particular system employed. In general, however, aromatic hydrocarbons such as toluene and xylene, ketones such as methyl ethyl ketone and methyl isobutyl ketone, alcohols such as isopropyl alcohol, normal butyl alcohol, monoalkyl ethers of glycols such as 2-alkoxyethanol, 2-alkoxypropanol and compatible mixtures of these solvents can be used.

Besides organic solvents, water can be used as a diluent either alone or in combination with water-miscible organic solvents. When water is used, the coating composition is usually modified such as by incorporating water-solubilizing groups such as the cationic groups mentioned above to provide for the necessary solubility in water. Besides the cationic groups mentioned above, other water-solubilizing groups such as non-ionic groups, for example, ethylene oxide groups, and anionic groups such as carboxylate salt groups may be introduced into the polymer to disperse or solubilize the coating composition in water.

The coating compositions of the invention may also optionally contain a pigment. Pigments may be of any conventional type, comprising, for example, iron oxides, lead oxides, strontium chromate, carbon black, coal dust, titanium dioxide, talc, barium sulfate, as well as color pigments such as cadmium yellow, cadmium red, chromium yellow and metallic pigments such as aluminum flake.

The pigment content of the coating composition is usually expressed as the pigment-to-resin weight ratio. In the practice of the present invention, pigment-to-resin weight ratios can be 2:1 or higher, and for most pigmented coatings, are usually within the range of about 0.05 to 1:1.

In addition to the above ingredients, various fillers, plasticizers, anti-oxidants, ultraviolet light absorbers, flow control agents, surfactants and other formulating additives can be employed if desired. These materials are optional and generally constitute up to 30 percent by weight of the coating composition based on total solids.

The coating compositions of the invention can be applied by conventional methods, e.g., non-electrophoretic methods including brushing, dipping, flow coating and spraying. Usually, they can be applied virtually over any substrate including wood, metal, glass, cloth, leather, plastic, foam and the like, as well as over various primers. For electroconductive substrates such as metals, the coatings can be applied by electrodeposition. In general, the coating thickness will vary somewhat depending upon the application desired. In general, coatings from about 0.1 to 10 mils can be applied and coatings from about 0.1 to 5 mils are usual.

When aqueous dispersions of the coating composition are employed for use in electrodeposition, the aqueous dispersion is placed in contact with an electrically conductive anode and an electrically conductive cathode. The surface to be coated can be made the cathode or the anode. In the case of cationic electrodeposition, which is preferred herein, the surface to be coated is the cathode. Following contact with the aqueous dispersion, an adherent film of the coating composition is deposited on the electrode being coated when a sufficient voltage is impressed between the electrodes. Conditions under which electrodeposition is carried out are known in the art. The applied voltage may be varied and can be, for example, as low as one volt or as high as several thousand volts, but is typically between 50 and 500 volts. Current density is usually between 1.0 ampere and 15 amperes per square foot and tends to decrease during electrodeposition indicating the formation of an insulating film.

After the coating has been applied, it is cured by heating at elevated temperatures for a period of time sufficient to form solvent-resistant coatings. By solvent-resistant coatings is meant that the coating will be resistant to acetone, for example, by rubbing across the coating with an acetone-saturated cloth. Coatings which are not cured or poorly cured will not withstand the rubbing action with acetone and will be removed with less than 10 acetone double rubs. Cured coatings, on the other hand, will withstand a minimum of 20 acetone double rubs, and preferably 100 acetone double rubs.

It has been found that substrates coated with compositions employing the novel urethanes can cure at relatively lower temperatures. In certain embodiments of the invention, it has been found that the urethanes impart excellent cure at temperatures as low as 121° C. (250° F.). It is a feature of this invention that in comparison with conventional curing agents, particularly those which comprise blocked isocyanate curing agents, the urethanes impart a higher degree of cure at ordinary cure temperatures and at relatively lower temperatures. It is a distinct feature of the invention that the novel urethanes are stable in coating compositions, particularly water-based coating compositions, and provide low temperature cure as described herein.

These and other aspects of the invention are illustrated more specifically by the following non-limiting examples.

EXAMPLE 1

This example illustrates the preparation of N,N-dibutylglycolamide. The following were used in the preparation:

| Ingredients | Parts by Weight (grams) |
| --- | --- |
| Glycolic acid (70% technical grade) | 3091.5 |
| N,N—dibutylamine (reagent grade) | 3538.1 |
| Toluene | 356.6 |
| Toluene | 213.8 |

At room temperature, a properly equipped reaction vessel was charged with the glycolic acid, followed by addition of the N,N-dibutylamine through a dropping funnel at a rate slow enough to prevent boiling of the reaction mixture in the flask. The reaction temperature was kept preferably below 70° C. so as to avoid loss of the amine. After the addition, the reaction mixture was heated to reflux at 110° C., held for one hour at reflux, cooled to 95° C., and then the first portion of toluene was added thereto. Thereafter, the reaction vessel was fitted with a Dean-Stark trap containing toluene and then heated to 103° C. to remove water from the mixture. The removal of water through the trap was continued until the temperature reached 170° C. Upon cooling to 105° C., the second portion of toluene was added. The mixture was again refluxed and water removed therefrom until the temperature reached 185° C. The resultant mixture was then vacuum stripped to remove toluene and excess amine using a 23-inch of mercury vacuum and a maximum temperature of 157° C. The resultant composition comprising N,N-dibutylglycolamide had a milliequivalent of acid per gram equal to 0.093, milliequivalent of amine per gram equal to 0.07 and percent of water equal to 0.040.

EXAMPLE 2

This example illustrates the novel urethane and the method of preparing same, using the above N,N-dibutylglycolamide and an isocyanate. The preparation was as follows:

| Ingredients | Parts by Weight (grams) |
| --- | --- |
| MONDUR TD-80[1] | 522.0 |
| Methyl isobutyl ketone | 469.4 |
| Trimethylolpropane | 134.0 |
| Dibutyltin dilaurate | 2 drops |
| Dibutylglycolamide of Example 1 | 494 |
| 2-Butoxyethanol | 42.3 |
| Butanol | 52.5 |

[1] An 80/20 mixture of 2,4- and 2,6-toluene diisocyanate, available from Mobay Chemical Company.

A solution of the diisocyanate and methyl isobutyl ketone was charged to a properly equipped reaction vessel at room temperature followed by addition of the trimethylolpropane in 3 equal portions with the reaction temperature being kept at about 40° C. Since the addition of the trimethylolpropane was exothermic, each addition after the first one was conducted after the exotherm had subsided. After adding all of the trimethylolpropane, the reaction mixture was allowed to digest for about 2½ hours over the temperature range of 36°–40° C. Thereafter, and at 40° C., the dibutyltin dilaurate was added to the reaction mixture. There was a mild exotherm with the temperature rising to 45° C.; the resultant mixture was held for about 3 hours at 45° C. until the trimethylolpropane had been reacted. At 50° C., the N,N-dibutylglycolamide was added to the reaction mixture. The resultant mixture was held at 80° C. for about 6 hours to effect the reaction of the N,N-dibutylglycolamide and the isocyanate. The reaction was sampled and found to contain a small amount of isocyanate. The 2-butoxyethanol was added to the reaction mixture and heated until only a small trace of isocyanate was found to be present in the resultant mixture. Following this, the butanol was added to the resultant mixture. The resultant composition comprising the novel urethane had a solids content of 69.62 percent.

EXAMPLE 3

This example illustrates the use of the novel urethane as a low temperature curing agent for coating compositions.

A low temperature-cure composition comprising an active hydrogen-containing material comprising a chain-extended adduct of an epoxy polymer and an amine (herein epoxy-amine adduct) was prepared as follows:

| Ingredients | Parts by Weight (grams) | Equivalents |
| --- | --- | --- |
| EPON 828[1] | 3623.8 | 19.2755 |
| PCP-0200[2] | 1286.9 | 4.8180 |
| Xylene | 316.3 | |
| Bisphenol A | 1098.7 | 9.6377 |
| Benzyldimethylamine | 7.7 | |

-continued

| Ingredients | Parts by Weight (grams) | Equivalents |
| --- | --- | --- |
| Benzyldimethylamine | 13.5 | |
| 2-Ethoxyethanol | 1123.8 | |
| Diketimine derived from diethylene triamine and methyl isobutyl ketone (73% solids in methyl isobutyl ketone) | 353.9 | 2.9492 |
| N—methylethanolamine | 284.5 | 3.7877 |

[1]Epoxy resin made from epichlorohydrin and bisphenol A having an epoxy equivalent of 188, commercially available from Shell Chemical Company.
[2]Polycaprolactone diol having a molecular weight of 543, available from the Union Carbide Corporation.

The EPON 828, PCP-0200 and xylene were charged to a properly equipped reaction vessel and heated with a nitrogen sparge to 208° C. The reaction was held at this temperature to reflux for about ½ hour to remove water via a Dean-Stark trap filled with xylene. The reaction mixture was cooled to 150° C. and the bisphenol A and the 7.7 parts by weight of the benzyldimethylamine (catalyst) were added. The reaction mixture was heated to 150°–190° C., held at this temperature for about ½ hour and then cooled to 130° C. The 13.5 parts by weight of the benzyldimethylamine catalyst were added and the reaction mixture held at 130° C. for 2½ hours until a reduced Gardner-Holdt viscosity (50 percent resin solids solution in 2-ethoxyethanol) of P was obtained. The 2-ethoxyethanol, methylethanolamine and diketimine were then added and the mixture was held at 110° C. for 1 hour. The resultant product had a solids content of 79 percent.

The above epoxy-amine adduct was blended with the novel urethane of Example 2 and formulated into a cationic paint as follows:

| Ingredients | Parts by Weight (grams) |
| --- | --- |
| The above epoxy-amine adduct | 458 |
| The crosslinking agent of Example 2 | 292 |
| DOWANOL PPH[1] | 29 |
| Acetic acid | 9.6 |
| Deionized water | 2727.1 |
| Pigment paste[2] | 235.0 |
| Catalyst paste[3] | 14.8 |
| Cationic dispersant[4] | 14.5 |

[1]Phenoxypropanol, available from Dow Chemical Company.
[2]The pigment paste comprised deionized water, pigments and a resinous pigment grinding vehicle as described in U.S. Pat. No. 4,007,154 (note Example II) which is incorporated herein by reference. The pigments used therein were carbon black, lead silicate, strontium chromate and aluminum silicate which were in a pigment-to-binder weight ratio of 2.5:1.
[3]The catalyst paste comprised a dibutyltin oxide, deionized water and the resinous pigment grinding vehicle described in footnote 2 above; these ingredients were ground to a Hegman No. 7 grind.
[4]The cationic dispersant comprised a mixture of 120 parts of GEIGY AMINE C (alkyl imidazole, commercially available from Geigy Industrial Chemicals); 120 parts by weight of SURFYNOL 104 (acetylenic alcohol, commercially available from Air Products and Chemicals Inc.); 120 parts by weight of 2-butoxyethanol, 221 parts by weight of deionized water and 19 parts by weight of glacial acetic acid.

The cationic paint was prepared by blending the cationic resin, the curing agent, the DOWANOL PPH and the cationic dispersant. The resultant composition was then neutralized with the acetic acid and dispersed slowly with the deionized water. The resultant composition was then blended with the pigment paste and the catalyst paste. The resultant composition comprising the cationic paint had a pigment-to-binder weight ratio of 0.2:1, a solids content of 20 percent and percent neutralization of 40.

The above cationic paint having a pH of 6.2 and bath conductivity of 1110 μmhos/cm at 77° F. (25° C.) was used to electrocoat panels of cold rolled steel substrates at 275 volts for 2 minutes at a bath temperature of 78° F. (26° C.). The electrocoated panels were baked at temperatures of 250° F. (121° C.), 275° F. (135° C.) and 300° F. (149° C.) for 20 minutes to obtain films of about 17.5 microns thickness. The baked films were hard and solvent resistant in that it took, respectively, 70, >100 and >100 acetone double rubs to remove the films.

EXAMPLE 4

This example illustrates the novel urethane of this invention and the method of preparing the same. The preparation entailed the reaction of N,N-dipentylglycolamide with toluene diisocyanate.

N,N-dipentylglycolamide was prepared in essentially the same manner as described in Example 1. The following were used in the preparation:

| Ingredients | Parts by Weight (grams) |
| --- | --- |
| Glycolic acid (70% technical grade) | 977.4 |
| N,N—dipentylamine | 1427.4 |
| Toluene | 112.5 |
| Toluene | 67.6 |

The resultant composition comprising the N,N-dipentylglycolamide had a milliequivalent of acid per gram of 0.036 and milliequivalent of base per gram of 0.161.

The above N,N-dipentylglycolamide was reacted with a toluene diisocyanate to produce the urethane of this invention. The method of preparation was essentially the same as described in Example 2.

The following were used in the preparation:

| Ingredients | Parts by Weight (grams) |
| --- | --- |
| MONDUR TDS[1] | 696.0 |
| Methyl isobutyl ketone | 850.0 |
| Trimethylolpropane | 178.9 |
| Dibutyltin dilaurate | 0.06 |
| Dipentylglycolamide, afore-described | 860.0 |
| Butanol | 94.4 |

[1]2,4-toluene diisocyante, available from Mobay Chemical Company.

The resultant composition comprising the urethane had a solids content of 66 percent.

The above urethane was evaluated as a low temperature curing agent for a cationic resin.

EXAMPLE 5

This example illustrates the novel urethane derived from N,N-dibutyllactamide, and the method of preparing and using same.

N,N-dibutyllactamide was prepared in essentially the same manner as described in Example 1, using the following:

| Ingredients | Parts by Weight (grams) |
| --- | --- |
| Lactic acid | 1105.7 |
| N,N—dibutylamine (reagent grade) | 1408.2 |
| Toluene | 132.0 |
| Toluene | 100.0 |

The resultant composition comprising N,N-dibutyllactamide had a milliequivalent of acid per gram of 0.077 and a milliequivalent of amine per gram of 0.118.

A urethane curing agent of the invention was prepared by reacting N,N-dibutyllactamide with a toluene diisocyanate. The following were used in the preparation:

| Ingredients | Parts by Weight (grams) |
| --- | --- |
| MONDUR TDS | 696.0 |
| Methyl isobutyl ketone | 813.5 |
| Trimethylolpropane | 178.7 |
| Dibutyltin dilaurate | 0.06 |
| Dibutyllactamide, afore-described | 804.0 |
| Butanol | 90.4 |

The resultant composition comprising the urethane had a solids content of 65 percent.

EXAMPLE 6

This example illustrates the novel urethane and the method of preparing same, using N-octylglycolamide.

N-octylglycolamide was prepared in essentially the same manner as described in Example 1, using the following:

| Ingredients | Parts by Weight (grams) |
| --- | --- |
| Glycolic acid | 362.5 |
| Octylamine | 450.0 |
| Toluene | 41.8 |

The resultant composition comprising N-octylglycolamide had a milliequivalent of acid per gram of 0.035 and a milliequivalent of amine per gram of 0.035.

A urethane of the invention was prepared by reacting the N-octylglycolamide with a toluene diisocyanate in essentially the same manner as described in Example 2. The following were used in the preparation:

| Ingredients | Parts by Weight (grams) |
| --- | --- |
| MONDUR TDS | 261.0 |
| Methyl isobutyl ketone | 327.7 |
| Trimethylolpropane | 67.0 |
| Dibutyltin dilaurate | 0.14 |
| N—octylglycolamide, afore-described | 266.5 |
| Butanol | 10.0 |

The resultant composition comprising the urethane had a solids content of 58.6 percent.

EXAMPLE 7

This example illustrates the novel urethane and the method of preparing same, using lactanilide.

Lactanilide was prepared using the following:

| Ingredients | Parts by Weight (grams) |
| --- | --- |
| Aniline | 177.0 |
| Methyl lactate | 198.5 |

At room temperature, a properly equipped reaction vessel was charged with the aniline and the methyl acetate. The charge was heated under a nitrogen blanket to reflux at 140° C. Infra-red spectral analysis of a sample of the reaction mixture indicated formation of lactanilide.

Thereafter, the reaction vessel was fitted with a Dean-Stark trap and heated to remove methanol from the reaction mixture. Samples of the reaction mixture were analyzed to determine formation of lactanilide, and for that matter, the consumption of the reactants. After sufficient formation of lactanilide, the resultant mixture was vacuum stripped to remove unreacted aniline and methyl lactate. The resultant composition comprising lactanilide had a milliequivalent of acid per gram of 0.045 and milliequivalent of amine per gram of 0.098.

A urethane of the invention was prepared by reacting the lactanilide with a toluene diisocyanate in essentially the same manner as described in Example 2. The following were used in the preparation:

| Ingredients | Parts by Weight (grams) |
| --- | --- |
| MONDUR TDS | 111.0 |
| Methyl isobutyl ketone | 100.0 |
| Trimethylolpropane | 28.5 |
| Dibutyltin dilaurate | 0.04 |
| Lactanilide, afore-described | 95.5 |
| Methyl isobutyl ketone | 135.8 |
| Ethylene glycol monobutyl ether | 3.0 |

The resultant composition comprising the urethane had a solids content of 61.6 percent.

EXAMPLE 8

This example illustrates the novel urethane and the method of preparing same, using morpholine amide of glycolic acid.

The morpholine amide of glycolic acid was prepared in essentially the same manner as described in Example 1, using the following:

| Ingredients | Parts by Weight (grams) |
| --- | --- |
| Glycolic acid | 721.3 |
| Morpholine | 584.4 |
| Toluene | 65.0 |
| Toluene | 40.0 |

The resultant composition comprising the morpholine amide of glycolic acid had a milliequivalent of acid per gram of 0.079 and a milliequivalent of amine per gram of 0.570.

A urethane of the invention was prepared by reacting morpholine amide of glycolic acid with a toluene diisocyanate in essentially the same manner as described in Example 2. The following were used in the preparation:

| Ingredients | Parts by Weight (grams) |
| --- | --- |
| MONDUR TDS | 360.0 |
| Methyl isobutyl ketone | 270.1 |
| Trimethylolpropane | 92.4 |
| Dibutyltin dilaurate | 0.06 |
| Morpholine amide of glycolic acid, afore-described | 300.0 |
| Methyl isobutyl ketone | 135.1 |

The resultant composition comprising the urethane had a solids content of 62 percent.

EXAMPLE 9

This example illustrates the novel urethane and the method of preparing same, using N-methyl-N-butyllactamide.

N-methyl-N-butyllactamide was prepared in essentially the same manner as described in Example 1, using the following:

| Ingredients | Parts by Weight (grams) |
|---|---|
| Lactic acid (88%) | 200.6 |
| N—methyl-N—butylamine | 185.0 |
| Toluene | 50 |
| Toluene | 50 |

The resultant composition comprising N-methyl-N-butyllactamide had a milliequivalent of acid per gram of 0.005 and a milliequivalent of amine per gram of 0.020.

A urethane of the invention was prepared by reacting N-methyl-N-butyllactamide with a toluene diisocyanate in essentially the same manner as described in Example 2. The following were used in the preparation:

| Ingredients | Parts by Weight (grams) |
|---|---|
| MONDUR TDS | 111.0 |
| Methyl isobutyl ketone | 240.0 |
| Trimethylolpropane | 28.5 |
| Dibutyltin dilaurate | 0.04 |
| N—methyl-N—butyllactamide | 98.4 |
| Ethylene glycol monobutyl ether | 90.4 |

The resultant composition comprising the urethane had a solids content of 61.6 percent.

EXAMPLE 10

This example illustrates the novel urethane and the method of preparing same, using N,N-diethyllactamide.

N,N-diethyllactamide was prepared in essentially the same manner as described in Example 7, using the following:

| Ingredients | Parts by Weight (grams) |
|---|---|
| Methyl lactate | 300.0 |
| Diethylamine | 231.4 |
| Diethylamine | 50.0 |

The resultant composition comprising N,N-diethyllactamide had a milliequivalent of acid per gram of 0.126 and a milliequivalent of amine per gram of 0.125.

A urethane of the invention was prepared by reacting N,N-diethylactamide with a toluene diisocyanate in essentially the same manner as described in Example 2. The following were used in the preparation:

| Ingredients | Parts by Weight (grams) |
|---|---|
| MONDUR TDS | 48.4 |
| Methyl isobutyl ketone | 43.6 |
| Trimethylolpropane | 12.5 |
| Dibutyltin dilaurate | 0.02 |
| N,N—diethyllactamide, afore-described | 38.8 |
| Methyl isobutyl ketone | 57.0 |
| Ethylene glycol monobutyl ether | 2.4 |

The resultant composition comprising the urethane had a solids content of 69.7 percent.

EXAMPLE 11

This example further illustrates the method of cationic electrodeposition of coating compositions containing the novel urethanes.

A cationic paint was formulated and electrocoated, as follows:

| Ingredients | Parts by Weight (grams) |
|---|---|
| The novel urethane of Example 5 (derived from dibutyllactamide) | 354.4 |
| Epoxy-amine adduct* | 1500.0 |
| Glacial acetic acid | 9.6 |
| Deionized water | 883.3 |
| Deionized water | 1704.6 |
| Cure catalyst paste* | 293.5 |
| Pigment paste* | 13.9 |

*The ingredient is the same as described in Example 3.

The epoxy-amine adduct was heated to 100° C. and mixed with the novel urethane. To the mixture was added the glacial acetic acid to effect neutralization thereof. The resultant mixture was thinned in the first portion of water to form an aqueous dispersion having a solids content of 35.5 percent. The dispersion was further thinned in the second portion of water.

To 1610 grams of the resultant aqueous dispersion were added the pigment and catalyst pastes and mixed to form a cationic paint having a solids content of 20 percent, a pigment-to-binder ratio of 0.2:1 and percent neutralization of 40.

The above paint, at a pH of 6.45 and bath conductivity of 1200 μmhos/cm and a bath temperature of 78° F. (26° C.), was used to electrocoat bare steel panels at 300 volts for 2 minutes. The electrocoated panels were baked at 275° F. (135° C.) to produce films of 17.5 microns thickness. The baked films were hard and solvent-resistant films, in that it took 60 acetone double rubs to remove the films.

EXAMPLE 12

This example also illustrates the method of cationic electrodeposition of coating compositions containing the novel urethanes. A cationic paint was formulated and electrocoated in essentially the same manner as described in Example 11, with the exception that the novel urethane used herein was as described in Example 4 (derived from dipentylglycolamide).

The following were used in the preparation:

| Ingredients | Parts by Weight (grams) |
|---|---|
| The novel urethane of Example 4 (derived from dipentylglycolamide) | 366.2 |
| Epoxy-amine adduct | 500.0 |
| Glacial acetic acid | 9.6 |
| Deionized water | 893.2 |
| Deionized water | 1556.5 |
| Cure catalyst paste | 222.3 |
| Pigment paste | 12.7 |

The cationic paint had a solids content of 20 percent, a pigment-to-binder ratio of 0.2:1 and percent neutralization of 40.

The above paint, at a pH of 6.1, bath conductivity of 960 μmhos/cm, and bath temperature of 80° F. (27° C.) was used to electrocoat bare steel panels at 50 volts for 2 minutes to produce films of 15 microns. The electrocoated panels were baked at 275° F. (135° C.) for 20 minutes to produce hard and solvent-resistant films, in that it required 75 acetone double rubs to remove them.

Therefore, what is claimed is:

1. A method of electrodeposition of an electroconductive surface serving as an electrode comprising passing an electric current between an anode and a cathode, immersed in an aqueous dispersion, said aqueous dispersion comprising an active hydrogen-containing material which contains an ionic group, and a curing agent having a urethane-containing moiety of the structure:

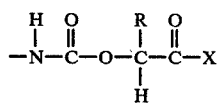

wherein R is hydrogen, an alkyl, alkenyl or aryl group, wherein X is hydrogen, an alkyl, alkenyl or aryl group, or wherein X is a moiety of the structure:

of which $R_1$ and $R_2$ are, each independently, hydrogen, an alkyl, alkenyl or aryl group, or members of a cyclic or heterocyclic group; said curing agent is present as a separate component or an integral component of the active hydrogen-containing material.

2. A method as recited in claim 1, wherein the active hydrogen-containing material is a polymer selected from the group consisting of an epoxy polymer, an acrylic polymer, an alkyd polymer, a polyester polymer, a polyether polymer, a polyurea polymer, a polyurethane polymer, and a mixture thereof.

3. A method as recited in claim 2, wherein the polymer is an epoxy polymer or an acrylic polymer.

4. A method as recited in claim 1, wherein R is hydrogen, an alkyl, alkenyl or aryl group.

5. A method as recited in claim 4, wherein the alkyl group contains from about 1 to 10 carbon atoms.

6. A method as recited in claim 5, wherein the alkyl group contains from about 1 to 5 carbon atoms.

7. A method as recited in claim 4, wherein R is hydrogen or a methyl group.

8. A method as recited in claim 1, wherein X is

of which $R_1$ and $R_2$ are, each independently, hydrogen, an alkyl, alkenyl or aryl group, or members of a cyclic or heterocyclic group.

9. A method as recited in claim 8, wherein the alkyl group contains from about 1 to 26 carbon atoms.

10. A method as recited in claim 9, wherein the alkyl group contains from about 2 to 18 carbon atoms.

11. A method as recited in claim 10, wherein the alkyl group contains from about 4 to 8 carbon atoms.

12. A method as recited in claim 1, wherein the urethane is obtained by reacting:
(A) an isocyanate, and
(B) a compound of the structure:

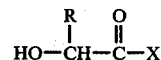

wherein R is hydrogen, an alkyl, alkenyl or aryl group, wherein X is hydrogen, an alkyl, alkenyl or aryl group, or wherein X is a moiety of the structure:

of which $R_1$ and $R_2$ are, each independently, hydrogen, an alkyl, alkenyl or aryl group, or members of a cyclic or heterocyclic group.

13. A method of claim 12, wherein the moiety X is

of which $R_1$ and $R_2$ are, each independently, hydrogen, an alkyl, alkenyl or aryl group, or members of a cyclic or heterocyclic group.

14. A method of claim 13, wherein the alkyl group contains from about 1 to 26 carbon atoms.

15. A method of claim 14, wherein the alkyl group contains from about 2 to 18 carbon atoms.

16. A method of claim 15, wherein the alkyl group contains from about 4 to 8 carbon atoms.

17. A method of claim 12, wherein R is hydrogen, an alkyl, alkenyl or aryl group.

18. A method of claim 17, wherein the alkyl group contains from about 1 to 10 carbon atoms.

19. A method of claim 18, wherein the alkyl group contains from about 1 to 5 carbon atoms.

20. A method of claim 17, wherein R is hydrogen or a methyl group.

21. A method of claim 12, wherein the compound is N,N-dibutylglycolamide, N,N-dibutyllactamide, N,N-dipentylglycolamide or lactanilide.

22. A method of claim 12, wherein the isocyanate is a polyisocyanate.

23. A method of claim 12, wherein the isocyanate is aromatic.

24. A method of claim 1, wherein the ionic group is a cationic base group.

* * * * *